(12) United States Patent
Grasso et al.

(10) Patent No.: US 6,288,810 B1
(45) Date of Patent: Sep. 11, 2001

(54) DEVICE FOR ADDING AND DROPPING OPTICAL SIGNALS

(75) Inventors: Giorgio Grasso, Monza; Fausto Meli, Piacenza, both of (IT); Marcos Antonio Brandão Sanches, Lexington, SC (US); Mario Tamburello, Vimercate (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/202,270

(22) PCT Filed: Jul. 28, 1997

(86) PCT No.: PCT/EP97/04091

§ 371 Date: May 7, 1999

§ 102(e) Date: May 7, 1999

(87) PCT Pub. No.: WO98/05133

PCT Pub. Date: Feb. 5, 1998

(30) Foreign Application Priority Data

Jul. 31, 1996 (IT) ................................. MI96A1638

(51) Int. Cl.[7] ..................................... H04J 14/02
(52) U.S. Cl. ........................... 359/127; 359/128; 359/130
(58) Field of Search ..................................... 359/127, 128, 359/130

(56) References Cited

U.S. PATENT DOCUMENTS

| 4,953,939 | 9/1990 | Epworth . | |
|---|---|---|---|
| 5,267,073 | 11/1993 | Tamburello et al. . | |
| 5,717,795 | * 2/1998 | Sharma et al. | 385/24 |
| 6,097,516 | 8/2000 | Almstrom | 359/119 |
| 6,101,012 | * 8/2000 | Danagher et al. | 359/127 |
| 6,122,418 | * 9/2000 | Ellis | 385/27 |

FOREIGN PATENT DOCUMENTS

| 0 431 654 | 6/1991 | (EP) . |
|---|---|---|
| 0 567 941 A2 | 11/1993 | (EP) . |
| 0 567 941 A3 | 11/1993 | (EP) . |
| 0 668 674 | 8/1995 | (EP) . |
| 0 677 902 | 10/1995 | (EP) . |
| 0 695 050 | 1/1996 | (EP) . |
| 0 729 248 | 8/1996 | (EP) . |
| WO 96/19884 | 6/1996 | (WO) . |

OTHER PUBLICATIONS

P.C. Hill et al., "Strain gradient chirp of fibre Bragg gratings", Electronics Letters, vol. 30, No. 14, pp. 1172–1174, (1994).

F. Ouellette, "Dispersion cancellation using linearly chirped Bragg grating filters in optical waveguides", Optic Letters, vol. 12, No. 10, pp. 847–849, (1987).

M.J. Chawki et al., "Wavelength reuse scheme in a WDM unidirectional ring network using a proper fibre grating add/drop multiplexer", Electronics Letters, vol. 31, No. 6, pp. 476–477, (1995).

K. Oda et al., "An Optical FDM–Add/Drop Multiplexing Ring Network Utilizing Fiber Fabry–Perot Filters and Optical Circulators", IEEE Photonics Technology Letters, vol. 5, No. 7, pp. 825–828, (1993).

T. Mizuochi et al., "All–fiber add/drop multiplexing of 6 x 10 Gbit/s using a photo–induced Bragg grating filter for WDM networks", Optical Fiber Communication (OFC), vol. 2, pp. 116–117, (1996).

* cited by examiner

Primary Examiner—Leslie Pascal
Assistant Examiner—Hanh Phan
(74) Attorney, Agent, or Firm—Finnegan, Henderson, Farabow, Garrett & Dunner, L.L.P.

(57) ABSTRACT

A multi-channel optical telecommunication system and method for transmitting optical signals having distinct wavelengths. Spectral selection is provided for the optical signals to add or drop signals of predetermined wavelengths. The signals are divided into at least two series of different wavelengths. The signals of each series are dropped or signals of corresponding wavelengths are added, and the signals are then combined.

8 Claims, 7 Drawing Sheets

DEVICE FOR ADDING AND DROPPING OPTICAL SIGNALS

DESCRIPTION

It is an object of the present invention to provide a device for adding or dropping optical signals of different wavelengths into or from an optical path and a method for inserting and/or extracting optical signals of different wavelengths into and from an optical path.

In the latest telecommunications technology, it is known to use optical fibers to send optical information-carrying signals for long-distance communication.

Optical telecommunication systems are known that use wavelength division multiplexing (WDM) transmission. In these systems several channels, i.e. a number of independent transmission signals, are sent over the same line by means of wavelength division multiplexing. The transmitted channels may be either digital or analog and are distinguishable because each of them is associated with a specific wavelength.

EP 668674 (Toshiba) discloses an optical WDM network system designed to permit communication between any of a plurality of nodes via a main trunk line. The nodes are interconnected by an optical fiber ring. Each of the nodes includes an add-rop multiplexer (ADM) for extracting light of a particular wavelength among the lights of a plurality of wavelengths transmitted via the main trunk line into the node and inserting the light of the preset wavelength from the node into the main trunk line. Each node further includes an optical receiver for receiving part of the light extracted by the ADM and a modulator for modulating the light extracted by the ADM with data to be transmitted and send the light back to said ADM. In an embodiment, the optical wavelength division multiplexer and demultiplexer of each of the terminal nodes can be realized by an ADM filter such as an acousto-optic filter or a waveguide type lattice filter. In this embodiment, at a node k only optical signals of wavelengths $\lambda k$ and $\lambda k'$ are directed to an optical WDM whereby the two optical signals are demultiplexed, while the optical signals of other wavelengths are transmitted by the ADM filter to the main trunk line.

Electronics Letters, Vol. 31, No. 6, 16/03/95, pp. 476–477 (M. J. Chawki et al.) discloses an experimental optical WDM ring network using an add/drop multiplexer (ADM) based on a fibre grating filter. The ring consists of a central node connecting N secondary nodes using dedicated wavelengths $\lambda_i (i=1 \ldots N)$ over one common fibre. The central node has four transmitters with a common erbium doped fibre amplifier (EDFA) and a 1:4 demultiplexer with four receivers. The optical wavelength ADM located in each secondary node is made of a 2:1 coupler, a fibre grating filter, a second 2:1 coupler and an EDFA. The node transmitters and receivers are connected to one of the input ports of the first and second coupler, respectively.

IEEE Photonics Technology Letters, Vol. 5, No. 7, July 1993, pp. 825–828 (K. Oda et al.) discloses that optical add/drop multiplexers (ADM's) can be constructed by optical filters and that there are many candidates for the filters which could be used for the ADM's; for example, the acousto-optic tunable filter (AOTF). The paper teaches that, however, the channel spacing of the AOTF is basically limited to a few nm, so that the number of channels is limited to approximately 10 because EDFA gain bandwidth is narrower than 30 nm. On the other hand, the channel spacing of the Fabry-Perot filter can be set to less than 1 nm because its finesse is sufficiently high. Accordingly, the paper proposes an optical ring network based on optical frequency division multiplexing and add/drop multiplexers (ADM's), wherein each ADM consists of a fiber Fabry-Perot filter and an optical circulator.

WO 96/19884 (Ericsson) discloses a method of configuring subnodes, or configuring a system of subnodes, in an optical network ring against both node and fiber failure by means of an optical add-rop multiplexer (OADM). The network comprises a working ring and a stand-by ring and each subnode Includes selective optical filter means, optical 2×2 switch means and optical amplifier means. The switching configuration of the optical 2×2 switch is controlled by the different available node states so that it is possible to select either of two measures in case of a fiber breakage, such as folding the ring or line switching. According to the inventor of WO 96/19884 the disclosed OADM structure, besides its advantages in connection with failures, offers a greater simplicity for adding and removing nodes in an existing optical network.

The Applicant has observed that known WDM communication systems are limited as concerns the number of channels, i.e. the independent wavelengths that can be used for transmission within the wavelength band available for signal transmission and amplification.

In order to combine and separate signals with different wavelengths-to combine the signals at the transmission station, for example, to drop some toward receivers located at intermediate nodes of the line or to introduce others at intermediate nodes or to send them to separate receivers at the receiving station--adjacent channels (in wavelength terms) must be separated by more than a minimum predetermined value.

Said minimum value depends on the characteristics of the components employed in the system, such as the spectral characteristics of the wavelength selective components (e.g. bandwidth, center-band attenuation, figure of merit) and the wavelength stability (thermal and temporal) of the selective components themselves and of optical signal sources.

In particular, the Applicant has observed that spectral selectivity of currently available wavelength selective components currently available may greatly limit the possibility of adding and dropping signals in multichannel transmission systems, particularly when there are signals with close wavelengths, e.g. separated by less than 2 nm.

The Applicant found it is possible to add and/or drop in an optical telecommunication system a number of independent optical channels greater than that permitted by known techniques, and closer in wavelength, by employing wavelength selective components of equivalent characteristics, if the input signals are divided into two series of staggered wavelengths. The signals of each series are independently dropped or signals of corresponding wavelength added, and the signals of the two series are then combined.

According to a first aspect, the present invention is related to a device for adding and dropping optical signals as claimed in claim 1.

Preferred embodiments of the device are given in dependent claims 2 to 4.

According to another aspect, the present invention relates to a multichannel optical telecommunication system for the transmission of optical signals as claimed in claim 5.

According to a third aspect, this invention relates to a method for adding/dropping optical signals as claimed in claim 6.

According to a fourth aspect, the present invention is related to a device for dropping optical signals as claimed in claim 7.

According to a fifth aspect, the present invention is related to a device for adding optical signals as claimed in claim 8.

Additional information may be derived from the following description, with reference to the attached drawings showing:

Figure 1:
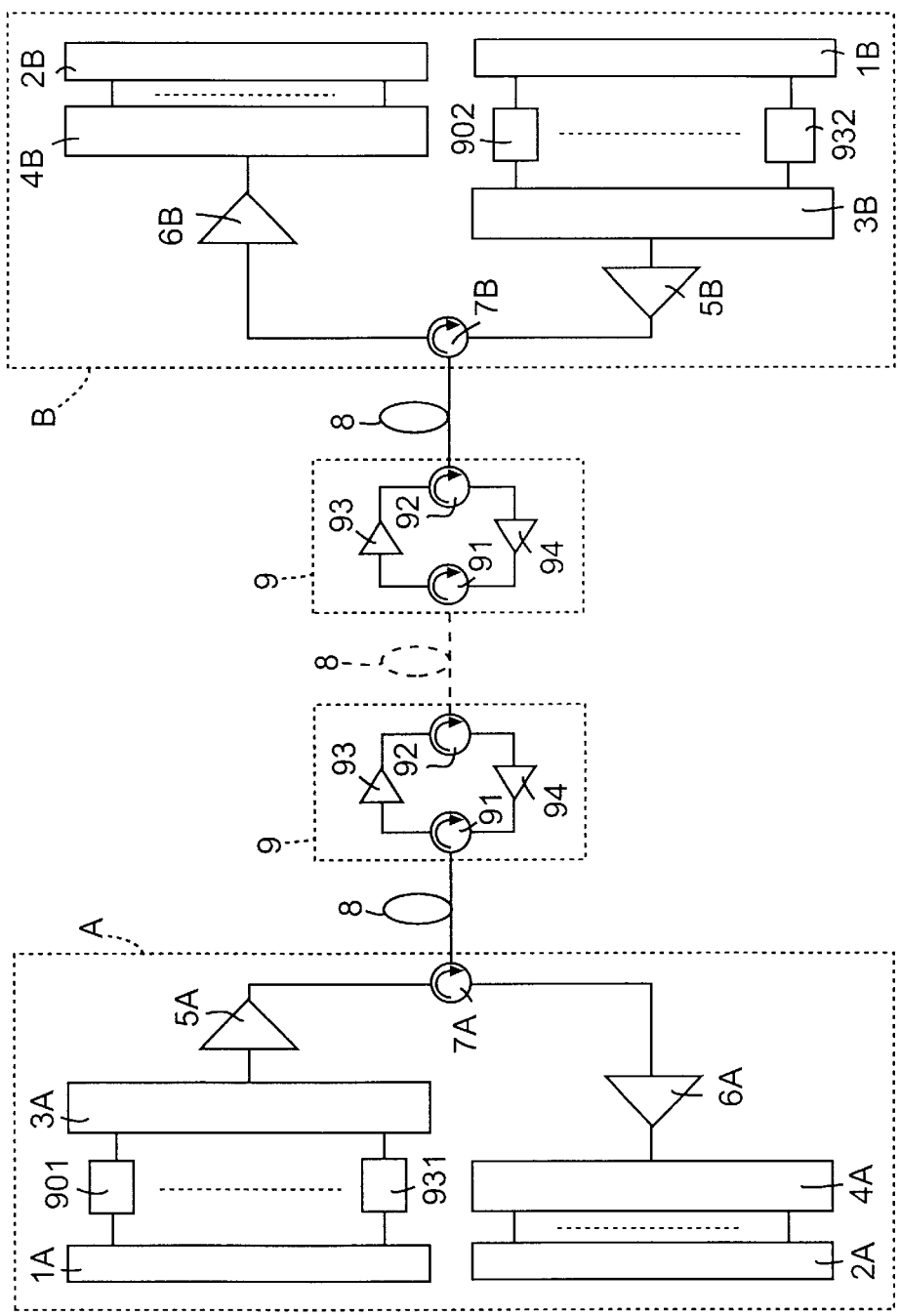
FIG. 1 is a diagram of an optical telecommunication system.

As shown in FIG. 1, a bidirectional optical telecommunication system with wavelength-division multiplexing, according to the present invention, comprises two terminal stations A and B, each of which includes a respective transmission station 1A, 1B and a respective receiving station 2A, 2B.

In particular, in the version shown in the figure, transmission station 1A comprises 16 optical signal transmitters with a first series of wavelengths, indicated with odd-numbered subscripts, $\lambda_1, \lambda_3, \ldots \lambda_{31}$, (included, for example, in the wavelength band of 1530–1565 nm) and transmission station 1B comprises 16 optical transmitters with a second series of wavelengths, indicated with even-numbered subscripts, $\lambda_2, \lambda_4, \ldots \lambda_{32}$.

The wavelengths of the second series are selected so that they are staggered with respect to the wavelengths in the first series.

In other words, each pair of wavelengths of one series encompasses a wavelength of the other series.

In the present case, the wavelengths of the two series will be indicated as staggered, more generally, even when the wavelengths of the signals of each of said series, corresponding to optical signals emitted by one of the transmission stations 1A, 1B and propagating in the system in one of the two directions, are separated (in frequency) by a quantity greater than or equal to 2D, where D indicates the minimum bandwidth (in frequency) of the wavelength selective components used in the system to separate the signals at the various wavelengths.

The number of independent wavelengths used for the signals for each transmission station is not limited to the value of 16 indicated in the device described and may assume a different value. The number of wavelengths, corresponding to the number of optical channels used for transmission in each direction, may be selected in relation to the characteristics of the telecommunication system. In particular, in a telecommunication system according to the present invention, it is possible, after the system implementation, to increase the number of channels to increase the transmitting capacity of the system, e.g. to accommodate an increased traffic demand, as will be indicated below.

The wavelengths may be selected so that the corresponding frequencies are equally spaced within the available spectral amplification band, so as to utilize said band efficiently.

It is possible, however, for the frequencies to be totally or partially unequally spaced, e.g. so as to reduce the effect of non-linear phenomena, such as four wave mixing (FWM) in optical fibers used for transmitting the signals.

The useful amplification band of the amplifiers may also be constituted of two or more distinct spectral bands separated by spectral bands not well-suited for signal transmission or amplification, e.g. due to the particular spectral characteristics of the amplifiers or optical fibers employed in the telecommunication system. In this case, the wavelengths of the communication channels may, for example, be selected such that the corresponding frequencies are equally spaced within each individual spectral band, with the separation between adjacent channels propagating in the same direction greater than or equal (in frequency) to twice said value D.

As an example, the wavelengths may assume values between about 1535 nm and about 1561 nm, where consecutive wavelengths, in ascending order, are used alternately for each of the two series $\lambda_1, \lambda_3, \ldots \lambda_{31}$ and $\lambda_2, \lambda_4 \ldots \lambda_{32}$. The spacing between the 32 total wavelengths, in this case, is about 0.8 nm.

The optical transmitters comprised in transmission stations 1A and 1B are modulated, directly or with external modulation, according to system requirements, in particular in relation with the chromatic dispersion of the optical fibers in the system, with their lengths, and with the intended transmission velocity.

The outputs of each transmitter of transmission stations 1A and 1B are connected to multiplexers 3A and 3B, respectively, which combine their optical signals each toward a single output, connected respectively to the input of optical power amplifiers 5A and 5B. The outputs of these amplifiers are connected to an input port of optical circulators 7A and 7B.

An intermediate port of optical circulators 7A and 7B is connected to one end of an optical line 8, which connects the two terminal stations A and B together.

The optical fiber of optical line 8 is normally a single-mode optical fiber of the step index or dispersion shifted type, conveniently included in a suitable optical cable, and has tens (or hundreds) of kilometers of length between each amplifier, up to the desired connection distance.

Inserted along line 8 are bidirectional optical amplifiers 9. Each of them comprises two optical circulators 91 and 92 and two optical amplifiers 93 and 94, which will be described further on. A central port of each optical circulator is connected to the optical fiber of line 8, e.g. through an optical connector, and acts as an input/output port for the bidirectional amplifier. Optical amplifier 93 is optically connected between an output port of optical circulator 91 and an input port of optical circulator 92. Optical amplifier 94 is optically connected between an output port of optical circulator 92 and an input port of optical circulator 91.

Although FIG. 1 indicates two bidirectional optical amplifiers 9, there may be one or more bidirectional optical amplifiers in succession, depending on the overall length of the optical connection and the power in the various sections of it. A fiber section between a terminal station and an amplifier, for example, or between two successive amplifiers, may be on the order of 100 kilometers long.

Receiving stations 2A and 2B are connected to the output ports of optical circulators 7A and 7B through preamplifiers 6A and 6B and demultiplexers 4A and 4B.

The optical circulators are passive optical components, commonly equipped with three or four access ports placed in an ordered sequence. After defining a first arbitrarily chosen access port as "input port", the next ports in sequence will be indicated as central port and output port. The optical circulators transmit unidirectionally the radiation input by each of the ports to one only of the other ports, namely the next one in sequence. The circulators used in the present invention are preferably of the polarization-independent type.

Preamplifier, in the context of the present invention, is an amplifier dimensioned to compensate the losses of the last section of optical line and the insertion losses of demultiplexer 4A or 4B, so that the power level of the signal input to the receiver is suited to the sensitivity of the device. It is also the task of the preamplifier to limit signal dynamics, reducing the power level variations of the signals at the receiver input with respect to the power level variation of the signals from the transmission line.

Demultiplexers 4A and 4B are suited for taking 16 signals overlapped in a single input port connected to the output of preamplifier 6A, 6B and separating them on to 16 optical fibers, in accordance with their respective wavelengths.

When the optical signals for transmission are generated by signal sources with their own transmission characteristics (such as wavelength, modulation type, power) different from those envisaged for the described link, each transmission station 1A, 1B comprises interfacing units 901, 903, ..., 931 and 902, 904, ..., 932, respectively, for receiving the optical signals generated by transmission stations 1A, 1B, detecting them, regenerating them with new characteristics suited to the transmission system and sending them to multiplexers 3A, 3B.

In particular, said interfacing units generate optical working signals with wavelengths $\lambda_1, \lambda_3, \ldots, \lambda_{31}$ and $\lambda_2, \lambda_4, \ldots, \lambda_{32}$, respectively, suited to the system requirements as described below.

U.S Pat. No. 5,267,073 by this same Applicant, the description of which is herein incorporated by reference, describes interfacing units comprising in particular a transmission adaptor for converting an optical input signal into a form well-suited for the optical transmission line and a reception adaptor for converting the transmitted signal into a form well-suited for a reception unit.

For use in the system of the present invention, the transmission adaptor comprises, preferably, an externally modulated laser as an output signal generation source.

Figure 2:
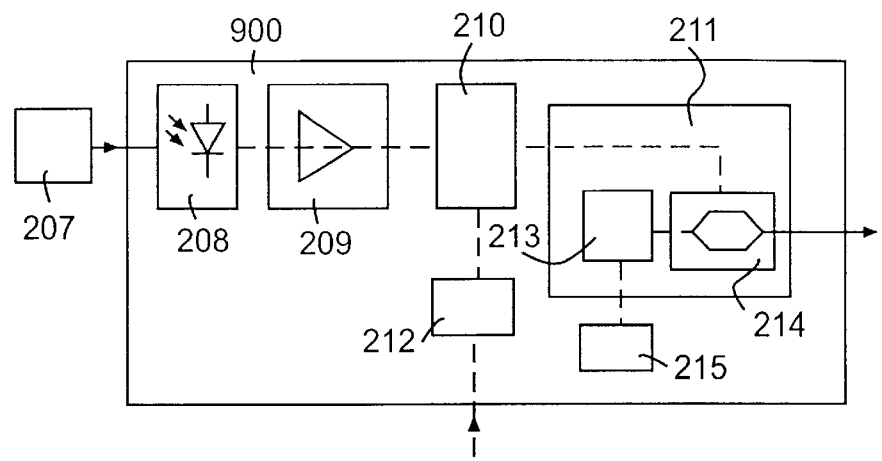
FIG. 2 is a diagram of a transmission interfacing unit.

The diagram of a transmission interfacing unit 900, of the type well-suited for use within the context of this invention, is shown in FIG. 2 in which, for the sake of clarity, the optical connections are represented by solid lines, while the electrical connections are represented by broken lines.

The optical signal, coming from an external source 207, is received by a photodetector (photodiode) 208, which emits an electrical signal which is fed to an electronic amplifier 209.

The electrical signal output by amplifier 209 is fed to a circuit 210 that drives a modulable laser emitter, designated overall as 211, that generates an optical signal at the selected wavelength, containing the information of the incoming signal.

If appropriate, a circuit 212 for inputting a service channel may be connected to driving circuit 210.

Modulable laser emitter 211 includes a continuous emission laser 213 and an external modulator 214, e.g. of the Mach-Zehnder type, driven by the output signal of circuit 210.

A circuit 215 controls the emission wavelength of laser 213, keeping it constant at the specified value and compensating for any external disturbances such as temperature and the like.

Transmission interfacing units of the type indicated are described in the aforesaid patent and marketed by the Applicant under the designation TXTIEM-XXX.

As an alternative, the laser transmitters in transmission stations 1A and 1B may be laser transmitters operating at the selected wavelengths, e.g. using DFB lasers at wavelengths $\lambda_1, \lambda_3, \ldots, \lambda_{31}$ and $\lambda_2, \lambda_4, \ldots, \lambda_{32}$, respectively.

Preferably, the wavelength of each source used for the signals is stable within +/−0.25 nm, more preferably within +/−0.1 nm.

With reference to FIG. 1, the optical circulators are components available commercially. A model well-suited for use in the present invention, for example, is the PIFC-100 produced by E-TEK DYNAMICS Inc., 1885 Lundy Ave., San Jose, Calif. (USA), characterized by an attenuation of 0.7 dB in transmission between two consecutive ports and by a response substantially independent from polarization.

Power amplifiers 5A and 5B raise the level of the signals generated by transmission stations 1A and 1B to a value sufficient to travel the section of optical fiber separating them from the receiving station or amplification means with sufficient terminal power to ensure the required transmission quality.

A power amplifier well-suited for use in the present invention will now be described with reference to FIG. 3.

The power amplifier represented is of the two-stage type. A first amplification stage comprises an active fiber 32, pumped counterdirectionally by a pumping source 34 through a dichroic coupler 33.

A second amplification stage comprises an active fiber 36, pumped counterdirectionally by a pumping source 38 through a dichroic coupler 37. An amplifier input 310 is connected through a first optical isolator 31 to the first amplification stage, and precisely to active fiber 32, whose output terminates in a branch of dichroic coupler 33. Pumping source 34 is connected to a second branch of dichroic coupler 33, while a third branch of the same dichroic coupler constitutes the signal output of the first stage.

A second optical isolator is located between the output of the first stage and an input of active fiber 36 of the second stage, whose output terminates in a branch of dichroic coupler 37. Pumping source 38 is connected to a second branch of dichroic coupler 37, while a third branch of the same coupler constitutes the signal output of the second stage, which terminates in an output 320, consisting preferably of a very-low-reflection optical connector, e.g. an angled connector with reflectivity less than −55 dB. Optical connectors of this type are marketed, for example, by SEIKOH GIKEN, 296-1 Matsuhidai, Matsudo, Chiba (Japan).

Output 320 is connected, in the telecommunication system of FIG. 1, with an optical circulator (7A or 7B). This circulator permits the unidirectional passage of radiation output by the power amplifier and prevents radiation from entering by that output. The circulator is thus equivalent to an additional optical isolator connected to the amplifier output, particularly in limiting its interferential noise.

Active optical fibers 32 and 36 are preferably silica optical fibers. A rare earth is used as a dopant, preferably erbium. Aluminum, germanium and lanthanum, or aluminum and germanium, may be advantageously used as secondary doping agents.

The concentration of dopants may correspond, for example, to an attenuation of around 7 dB/m, for the active fiber in the absence of pumping.

In a preferred embodiment, the amplifier described uses erbium-doped active fibers of the type presented in detail in patent application EP 677902, in the name of the Applicant, which is herein incorporated by reference.

The lengths of active fibers 32 and 36 may be around 7 m and 5 m, respectively.

For dichroic couplers 33 and 37, fused-fiber couplers may be used, formed of monomodal fibers at 980 nm and in the 1530–1565 nm wavelength band, with optical power output variation with respect to polarization<0.2 dB.

Dichroic couplers of the type indicated are known and commercial and are produced, for example, by the aforesaid E-TEK DYNAMICS.

Optical isolators 31 and 35 are of the type independent of the transmission signal polarization, with isolation greater than 35 dB and reflectivity less than −50 dB. The isolators are, for example, model MDL I-15 PIPT-A S/N 1016 of the firm ISOWAVE, 64 Harding Ave., Dover, N.J. (USA) or model PIFI 1550 IP02 of the aforesaid E-TEK DYNAMICS.

Pumping sources 34 and 38 may be, for example, quantum well lasers with an emission wavelength of $\lambda_p$=980 nm. The optical emission power envisaged is around 75 mW for source 34 and 90 mW for source 38.

Lasers of the type indicated are produced, for example, by LASERTRON INC. 37 North Avenue, Burlington, Mass. (USA).

A power amplifier like the one described furnishes, for example, output power of around 16 dBm, with a noise figure of around 5 dB.

The power amplifier described with reference to FIG. 3 uses counterpropagating pumping for both amplification stages. Counterpropagating pumping for both stages or for just one of them, the first stage in particular, are equally possible. The choice of which configuration to use is left to the skilled in the art, according to the characteristics of the overall communication system.

The optical power amplifier may also be embodied as a single-stage amplifier, depending on the gain required and the characteristics of the telecommunication system in which it is to be used. It is possible, for example, with reference to the device in FIG. 3, to omit active fiber 36, dichroic coupler 37 and pumping source 38. This simpler configuration offers less optical output power and may be sufficient for particular embodiments of the amplification system, e.g. with a smaller number of communication channels or with optical fiber sections of limited length downstream of the amplifier.

Figure 4:
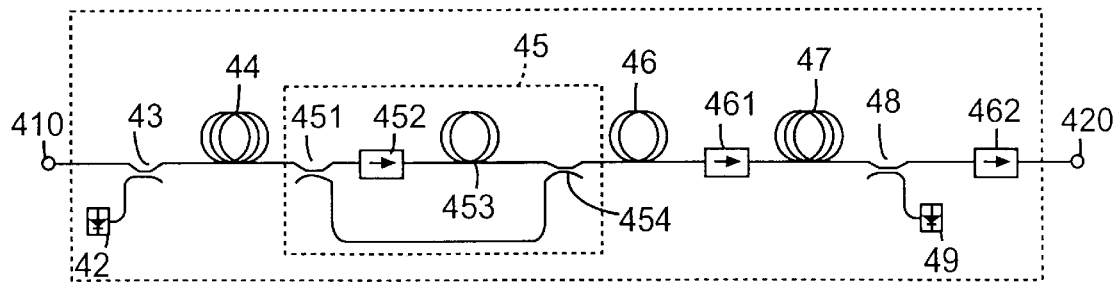
FIG. 4 is a diagram of an optical preamplifier.

Preamplifiers 6A and 6B of the system in FIG. 1 are, for example, optical amplifiers of the type that will be described now with reference to FIG. 4, which represents a two-stage preamplifier.

A first amplification stage comprises a first active fiber 44, pumped by a pumping source 42 through a dichroic coupler 43, a differential attenuator 45, connected to the output of active fiber 44, to attenuate the telecommunication signals without significantly attenuating the residual pumping radiation, and a second active fiber 46 pumped by means of said residual pumping radiation.

A second amplification stage includes an active fiber 47, pumped by a pumping source 49 through a dichroic coupler 48.

An input 410 of the preamplifier, consisting preferably of a very-low-reflection optical connector, e.g. of the type previously indicated, is connected to the first amplification stage, and precisely to a first input of dichroic coupler 43, to a second input of which pumping source 42 is connected. An output of dichroic coupler 43 terminates in active fiber 44.

Input 410 is connected, in the telecommunication system in FIG. 1, to an optical circulator (7A or 7B). This circulator permits the unidirectional passage of radiation to the preamplifier and prevents radiation from exiting that input. The circulator is thus equivalent to an additional optical isolator connected to the amplifier input, particularly in limiting interferential noise.

Differential attenuator 45 is connected between active fiber 44 and active fiber 45. Its function is to attenuate the telecommunication signals by a predetermined quantity without significantly attenuating the residual pumping radiation from active fiber 44. A differential attenuation of the signals with respect to the pump, in a suitable intermediate position between two sections of active fiber of an optical amplifier, as described in patent applications EP567941 and EP695050 in the name of the Applicant, makes it possible to compress the amplifier dynamics, i.e. to limit the power variations of the signals output by the amplifier with respect to the power variations of the input signals.

Differential attenuator 45 comprises a dichroic coupler 451 to separate the signals at the telecommunication channel wavelengths to a first output and the residual radiation at the wavelength of pumping source 42 to a second output. Said first output is connected via an optical isolator 452 to a first input of a dichroic coupler 454. Said second output is connected via a section of optical fiber to a second input of dichroic coupler 454. Optical isolator 452 provides an attenuation of around 1 dB to the telecommunication signals that transit through it, while the residual pump radiation is not significantly attenuated. The optical isolator also blocks the counterpropagating radiation, with the effect of reducing the amplifier noise. A section of attenuating optical fiber 454, with predetermined attenuation, can be connected in lieu of the optical isolator, or preferably in series with it. The characteristics of this attenuating fiber may be predetermined according to the indications contained in the two patent applications cited.

Dichroic coupler 454 combines the residual pump radiation with the attenuated telecommunication signals to active fiber 46, which further amplifies the signals.

An optical isolator 461 is placed between the output of the first stage and the input of the second stage.

An output of said isolator terminates in one end of active fiber 47, while the other end is connected to a dichroic coupler 48. Pumping source 49 is connected to an input of said dichroic coupler 48 in such a way as to feed active fiber 48. An output of dichroic coupler 48 is connected, by means of an optical isolator 462, to an output 420 of the preamplifier.

Although the pumping scheme described (copropagating for the first stage and counterpropagating for the second stage) is preferable, other pumping schemes are equally possible.

The characteristics and type of components of the preamplifier may generally be selected according to the previous indications regarding the power amplifiers described.

In particular, in the case of the preamplifier, the lengths of active fibers 44, 46 and 47 may be advantageously around 7 m, 3 m and 6 m, respectively.

Pumping sources 42 and 49 may be, for example, quantum well lasers with an emission wavelength of $\lambda_p$=980 nm.

The optical emission power is envisaged at 65 mW for source 42 and 75 mW for source 49.

A preamplifier like the one described gives, for example, output power of 16 dBm, with a noise figure of 5 dB.

The preamplifier may also be embodied as a single stage amplifier, depending on the gain required and the characteristics of the telecommunication system in which it is to be used.

Multiplexers 3A and 3B of the system in FIG. 1 are passive optical devices, by which the optical signals transmitted on respective optical fibers are combined in a single fiber. Devices of this type consist, for example, of fused-fiber-, planar-optics-, microoptics-couplers and similar. Suitable multiplexers, for example, are marketed by the aforesaid firm E-TEK DYNAMICS.

Figure 5A:
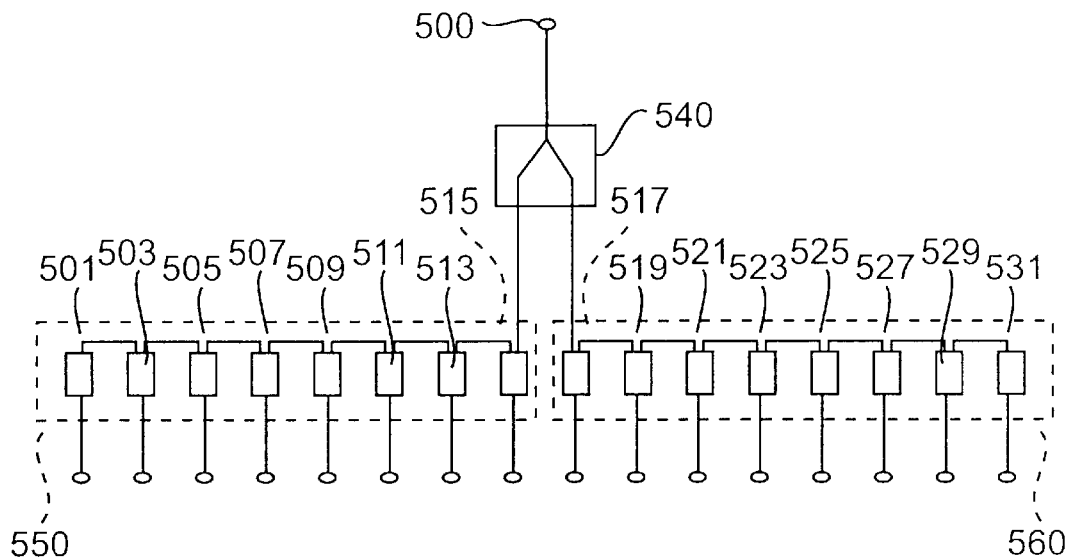
FIG. 5A is a diagram of an optical demultiplexer.

An example of demultiplexer well-suited for use in the present invention is indicated in FIG. 5A. The figure represents a demultiplexer well-suited for use in a system with 16 channels, i.e. 16 independent wavelengths, for each path direction. A similar scheme may be employed in cases where the system calls for a different number of channels. The signals input to a port 500 are separated by means of a 3 dB splitter, 540, to two groups of cascaded wavelength selective splitters 550 and 560 (briefly indicated as selective splitters). Each selective splitter is capable of routing to a first output the signals applied to one of its inputs with wavelengths centered around one of the transmission channels employed in the system and of reflecting to a second output the signals with wavelengths external to that band. Said second output of each selective splitter is connected to the input of a successive selective splitter, so as to form a cascaded connection. In the device illustrated in the figure, corresponding to demultiplexer 4B of FIG. 1, group 550 includes selective splitters 501, 503, . . . , 515, selective around wavelengths $\lambda_1, \lambda_3, \ldots, \lambda_{15}$ respectively, while group 560 comprises selective splitters 517, 519, . . . , 531 selective around wavelengths $\lambda_{17}, \lambda_{19}, \ldots, \lambda_{31}$, respectively. The device described is well-suited for use as demultiplexer 4B in the telecommunication system of FIG. 1. A similar device, using selective splitters at wavelengths $\lambda_2, \lambda_4, \ldots, \lambda_{32}$ may be employed to embody demultiplexer 4A of the telecommunication system in FIG. 1.

Figure 5B:
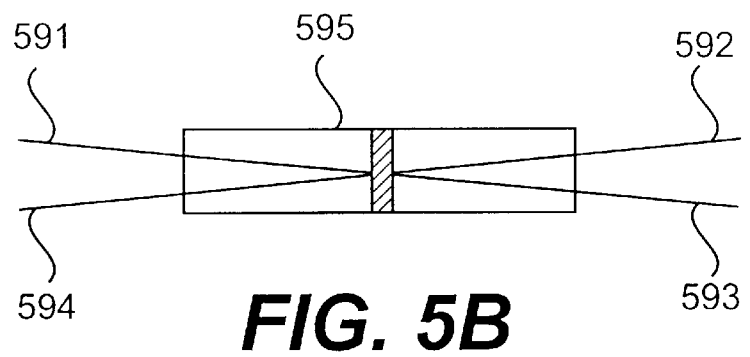
FIG. 5B is a diagram of a wavelength-selective optical splitter.

The selective splitters may preferably be of the type diagramed in detail in FIG. 5B, having four access optical fibers (input and output ports) designated 591, 592, 593 and 594, respectively, and containing in the center a selective reflecting component 595 which acts as a transmission bandpass filter and a reflective band-suppression filter, i.e. designed to transmit with low attenuation (e.g. with attenuation lower than 1.5 dB) signals with wavelengths within a predetermined band and reflecting (with attenuation of the same order of magnitude) signals with wavelengths outside that band. A signal input to fiber 591 of the selective splitter with wavelength $\lambda_p$ inside the passing band of component 595, for example, is transmitted to fiber 593 and, similarly, signals at $\lambda_p$ are transmitted from fiber 594 to fiber 592 or, symmetrically, from fiber 593 to fiber 591 and from fiber 592 to fiber 594. A signal input to fiber 591 with wavelength $\lambda_r$ outside that band, on the other hand, is reflected to fiber 594 and similarly signals at $\lambda_r$ proceed from fiber 592 to fiber 593 and symmetrically from fiber 594 to fiber 591 and from fiber 593 to fiber 592.

The band of wavelengths, close to a wavelength of minimal transmission attenuation, which corresponds, in transmission through selective reflecting component 595, to an attenuation of no more than 0.5 dB in addition to the minimal attenuation, will be indicated hereinafter as "0.5 dB passband" of selective reflecting component 595 or, by extension, as 0.5 dB passband of the selective splitter.

Likewise, the band of wavelengths, close to a wavelength of minimal reflection attenuation, which corresponds, in reflection through selective reflecting component 595, to an attenuation of no more than 0.5 dB in addition to the minimal attenuation, will be indicated hereinafter as "0.5 dB reflected band" of selective reflecting component 595 or, by extension, as 0.5 dB reflected band of the selective splitter.

The selective splitters are selected in a way that, for each of them, the wavelength of one of the communication channels is included in the respective 0.5 dB passband, while the wavelengths of the remaining communication channels are included in the respective 0.5 dB reflected band.

By analogy, the band of wavelengths corresponding in transmission through the selective splitter to an attenuation of no more than 20 dB in addition to the minimal attenuation is indicated as a −20 dB passband of the selective splitter.

Although described with four access fibers, the selective splitters suitable for the aforesaid use may have only three access fibers, the fourth (e.g. the one indicated as 594) remaining unused.

Selective splitters of the type indicated and well-suited for use in the present invention are marketed, for example, by Optical Corporation of America, 170 Locke Drive, Marlborough, Mass. (USA).

Selective splitters of the type indicated are now available, e.g., with a 0.5 dB passband of about 0.7 nm and a 20 dB bandwidth of about 2.4 nm.

Selective splitters based on Mach-Zehnder interferometers employing Bragg fiber-optic gratings, such as the "Mach-Zehnder based FBG" model produced by INNOVATIVE FIBER, are also suitable for use in the present invention.

Of possible use in the present invention are also, for example, demultiplexers made, according to the general scheme of FIG. 5A, with groups of cascaded selective splitters integrated on a single substrate, such as those produced by the aforesaid Optical Corporation of America.

Demultiplexers of the type described may be easily adapted to operate with a number of channels different from that determined in the system installation phase. It is possible, for example, to add one or more selective splitters cascaded with the selective splitters already present, so as to permit the demultiplexing of additional wavelengths.

The Applicant observes that the number of independent channels transmitted in the system may, through the present invention, be greater than the number of channels that can be separated by the available demultiplexers. Thus, for example, with reference to the example described, a total of 32 channels are transmitted through the system (16 in each direction) using demultiplexers adapted to separate 16 channels.

A bidirectional multichannel optical amplifier 9 according to the present invention, well-suited for use in the telecommunication system of FIG. 1, will now be described in greater detail with reference to FIG. 6.

Multichannel optical amplifiers 93 and 94 connected between optical circulators 91 and 92 in such a way as to amplify the signals propagating from transmission station 1A to receiving station 2B and, respectively, from transmission station 1 B to receiving station 2A, are embodied as wavelength selective optical amplifiers and namely selective at the wavelengths $\lambda_1, \lambda_3, \lambda_5, \ldots, \lambda_{29}, \lambda_{31}$ and, respectively, $\lambda_2, \lambda_4, \lambda_6, \ldots, \lambda_{30}, \lambda_{32}$.

In a first stage of amplifier 93, a dichroic coupler 62 feeds the communication signals coming from an input port 641, connected to an output port of optical circulator 91, and the pumping radiation, coming from a first optical pumping source 61 connected to dichroic coupler 62, to a first active optical fiber 63, whose output terminates in an input of a dichroic coupler 671. A first output of dichroic coupler 671 is connected in input to an optical isolator 672, while a second output of dichroic coupler 671 is connected to an input of a dichroic coupler 675 by means of an optical fiber section, so as to constitute a low-attenuation path for the residual pump radiation downstream of active fiber 63.

A comb filter is connected between the output of optical isolator 672 and a second input of dichroic coupler 675 by means of low-reflectivity connectors 673 and 674.

The comb filter has a passband that includes wavelengths $\lambda_1, \lambda_3, \lambda_5, \ldots, \lambda_{29}, \lambda_{31}$ of the signals propagating from transmission station 1A to receiving station 2B. Wavelengths $\lambda_2, \lambda_4, \lambda_6, \ldots, \lambda_{30}, \lambda_{32}$, of the signals propagating in the system in the opposite direction, on the other hand, are external to the passband of said comb filter.

Said comb filter may include, as illustrated in the figure, an optical circulator 64 with a selective reflection circuit 65 connected to one of its intermediate ports. Said circuit 65 comprises serially connected filters 601, 603, 605, . . . , 629 and 631, with selective reflection at wavelengths $\lambda_1, \lambda_3, \lambda_5, \ldots, \lambda_{29}, \lambda_{31}$, respectively, and is terminated by a low-reflectivity termination 650.

An output of dichroic coupler 675 terminates in a second active optical fiber 66, which in turn terminates at in input of an optical isolator 676.

Said second active fiber 66 is pumped through the residual pump radiation from first active fiber 63.

The output of optical isolator 676 is connected to a third active optical fiber 67. Active fiber 67 is fed with counter-propagating pumping radiation through a optical pumping source 69 and a dichroic coupler 68.

An output of dichroic coupler 68 is connected to an output port 68, connected to an input port of optical circulator 92.

In amplifier 93, signals at wavelengths $\lambda_1, \lambda_3, \lambda_5, \ldots, \lambda_{29}, \lambda_{31}$ input to port 641 are amplified in the first stage of amplification, transmitted by the comb filter through the reflection of each signal by one of the selective reflection filters of circuit 65 and further amplified in the second stage of amplification.

Any other signals, or noise, at wavelengths external to the bands of selective reflection filters 601, 603, . . . , 631, after passage through the first amplification stage, are transmitted through circuit 65 without being reflected and are eliminated from the circuit through low-reflectivity termination 650.

Multichannel amplifier 94 is similar to multichannel amplifier 93. For a description of the corresponding parts and the general functioning of amplifier 94, refer therefore to the previous description of amplifier 93.

In amplifier 94, the comb filter has a passband that includes wavelengths 2, $\lambda_4, \lambda_6, \ldots, \lambda_{30}, \lambda_{32}$ of the signals propagating from transmission station 1B to reception station 2A. Wavelengths $\lambda_1, \lambda_3, \lambda_{29}, \ldots, \lambda,_{31}$ of signals propagating in the system in the opposite direction are external to the passband of said comb filter.

This comb filter may comprise, as illustrated in the figure, an optical circulator 654 with a selective reflection circuit 655 connected to one of its intermediate ports. This circuit 655 includes serially connected filters 602, 604, 606, . . . , 630, 632, with selective reflection at wavelengths $\lambda_2, \lambda_4, \lambda_6, \ldots, \lambda_{30}, \lambda_{32}$, respectively. Reflection circuit 655 is terminated by a low-reflectivity termination 650.

Optical amplifiers 93 and 94 described are of the two-stage type. A first stage of amplification comprises active fiber sections 63, 653 and 66, 656. Active fibers 63 and 653 are pumped directly by sources 61 and 651 through dichroic couplers 62 and 652. Active fibers 66 and 656, connected downstream from the comb filter, are pumped with residual pumping radiation present at the output of active fibers 63 and 653 by means of the low-attenuation path created by connecting together dichroic couplers 671, 675 and 681, 685, respectively.

The signal attenuation by optical isolator 672, optical circulator 64 and selective reflection circuit 65, connected along the optical signal path in the section between dichroic couplers 671,675 and 681, 685, respectively, and the reduced attenuation of the residual pump radiation compress the signal dynamics in the first amplifier stage, according to the mechanism previously illustrated with reference to differential attenuator 45 of the device in FIG. 4.

A second stage of amplification comprises active fiber sections 67 and 675, which are pumped by pumping sources 69 and 659 through dichroic couplers 69 and 659.

The second stage, operating in saturation, further compresses the signal dynamics.

The length of active fiber 67, 657 of the second stage is to advantage around ⅔ the total length of the active fiber of the first stage (fiber 63, 66).

The length of active fiber 66,656, connected downstream from the comb filter, is to advantage around half the length of active fiber 63, 653, connected upstream from the comb filter.

Figure 3:
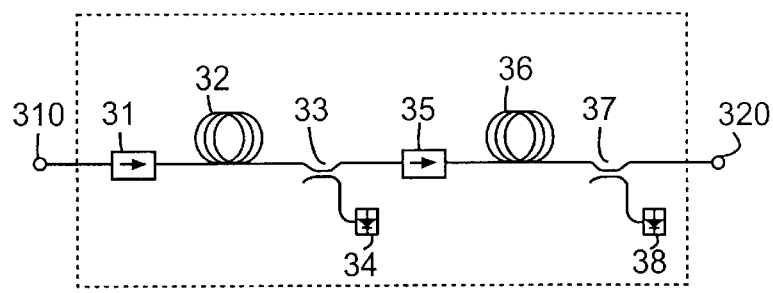
FIG. 3 is a diagram of an optical power amplifier.

If the active fibers used are of the type previously indicated with reference to the power amplifier in FIG. 3, for example, the lengths of active fibers 63 and 653, 66 and 656, 67 and 657 may be around 7 m, 3 m and 6 m, respectively.

Active fiber 66, 656 may be used to good advantage, according to the description, to compensate at least in part for the signal attenuation by the comb filter.

Said active fiber 66, 656 may be omitted, however, particularly if the attenuation of the comb filter is sufficiently low. If fiber 66, 656 is not present in the amplifier, it is also possible to omit the low-attenuation path for the pumping radiation, comprising dichroic coupler 671, 675 and 681, 685, respectively, and the respective connecting optical fibers. In this case, active fiber 63, 653 is connected directly to the input of optical isolator 672, 682 and connector 674, 684 directly connects the input port of optical circulator 64, 654 and the input of optical isolator 676, 686.

Optical amplifiers 93, 94, depending on the required gain and the characteristics of the telecommunication system in which it is to be used, may also be embodied as single-stage amplifiers. It is possible, for example, with reference to device 93 of FIG. 6, to omit the second stage comprising active fiber 67, dichroic coupler 68 and pump source 69. This simpler configuration may be sufficient to cover shorter sections of optical line.

Figure 6:
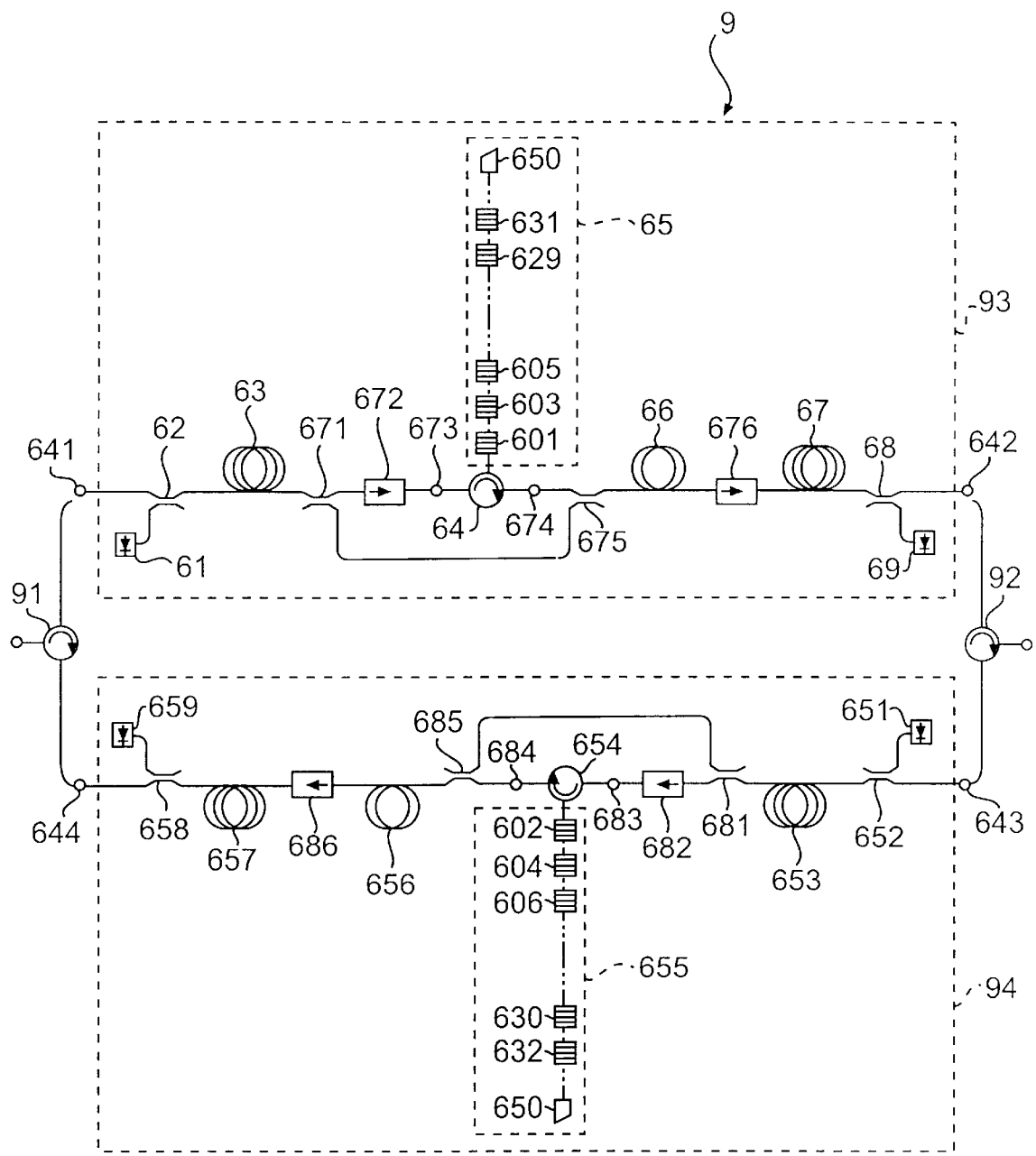
FIG. 6 is a diagram of a bidirectional optical amplifier

Although the embodiment described with reference to FIG. 6 is preferable, particularly in terms of noise figure and output power, another alternative would be to connect the comb filter downstream or upstream from the power amplifier, respectively.

A bidirectional multichannel optical amplifier 9 may be realized by using, where no otherwise specified, components similar to those previously described with reference to the devices in FIGS. 3 and 4.

Pump sources 61, 69, 651, 659, for example, may be quantum well lasers with an emission wavelength $\lambda_p$=980 nm. The optical emission power envisaged is around 90 mW for each source.

Optical connectors 676, 674, 683, 684, for example, are connectors with reflectivity of less than −40 dB. Connectors of this type are produced, for example, by the aforesaid firm SEIKOH GIKEN.

Selective reflection filters well-suited for use in the present invention, for example, are distributed Bragg reflection optical waveguide filters. They reflect the radiation within a narrow wavelength band and transmit the radiation outside said band. They consist of a portion of optical waveguide, e.g. optical fiber, along which an optical parameter, e.g. the refractive index, has a periodic variation. If the reflected portions of the signal at each change of index are mutually in phase, constructive interference occurs and the incident signal is reflected. The condition of constructive interference, corresponding to maximum reflection, is expressed by the relationship $2.I=\lambda_s/n$, where I indicates the pitch of the grating formed by the variations in the index of refraction, $\lambda_s$ the wavelength of the incident radiation and n the refractive index of the waveguide core. The phenomenon described is indicated in the literature as distributed Bragg reflection.

A periodic variation of the refractive index may be obtained by known techniques, e.g. by exposing a portion of optical fiber, deprived of its protective coating, to the interference fringes formed by an intense UV beam (like that generated by an excimer laser, a frequency-doubled argon laser or a frequencyquadrupled Nd:YAG laser) made to self-interfere by a suitable interferometric system, e.g. by means of a silica phase mask, as described in U.S. Pat. No. 5,351,321. The fiber, and particularly the core, are thus exposed to UV radiation of an intensity varying periodically along the optical axis. In the areas of the core reached by the UV radiation the Ge-O bonds are partially broken causing a permanent change in the refraction index.

The central wavelength of the reflected band can be determined at will by selecting a grating pitch that results in the constructive interference relationship.

With this technique it is possible to obtain filters with a −3 dB reflected wavelength band of only 0.2–0.3 nm, reflectivity at the center of the band almost up to 100%, a central wavelength of the reflected band that can be determined in the construction phase within +/−0.1 nm and a temperature variation of the central wavelength of the band not greater than 0.02 nm/° C.

Optical distributed Bragg reflection filters with a broader reflection band can be realized by gradually chirping the grating pitch along its extension between two values, corresponding to the wavelengths that delimit the desired reflection band.

Optical fiber distributed Bragg reflection filters with chirped grating are known, for example, from the article by P. C. Hill et al. published in Electronic Letters, vol. 30 no. 14, 7 July 94, pages 1172–74.

The gradual variation of the grating pitch, in a distributed Bragg reflection filter, may also be employed to realize filters capable of compensating for the delay (or advance) of some chromatic components of an optical signal with respect to others. For this reason, components of a signal with different wavelengths must be reflected by different portions of the same grating, displaced on an optical path so as to compensate for said delay or said advance.

Chromatic dispersion, i.e. the delay (or advance) per wavelength unit of a grating having a pitch that may vary between two extreme values, depends not only on the width of the reflected band but also on the length of the grating or, in greater detail, on a quantity equal to twice the length of the grating multiplied by the effective index of refraction of the means in which it is embodied. This quantity corresponds to the difference between the optical paths of the signal chromatic components which are reflected close to the two extremes of the grating.

The use of distributed Bragg reflection filters for compensating chromatic dispersion is known, for example, from the aforementioned article by F. Ouellette published in Optics Letters or from U.S. Pat. No. 4,953,939.

To compensate for the chromatic dispersion at the communication signal wavelengths, it is possible to use as selective reflection filters 601, 603, . . . , 631 and 602, 604, . . . , 632 optical fiber distributed Bragg reflection filters with chirped grating.

In this case, each of the filters will be realized with a central wavelength and passband width suitable to reflect radiation corresponding to one of the communication channels, and with dispersion characteristics that compensate for the chromatic dispersion of the corresponding communication channel.

Depending on the conditions under which the device is used, the filters may be realized in such a way as to provide the reflected communication signal with a chromatic dispersion equal in absolute value, and of opposite sign, to that (estimated or measured) accumulated by the signal through the fiber sections it has traveled, or such as to overcompensate for the dispersion accumulated by the signal, so that the dispersion is nullified at a successive point on the optical signal path, including an additional section of optical fiber.

If the amplifier is used under conditions characterized by significant variations in temperature, it may be advisable to thermally stabilize fiber optic filters 601, 603, . . . , 631 and 602, 604, . . . , 632.

The optical output power of an optical amplifier 93 or 94 as described is, in an example, about 16 dBm under operating conditions, with circulators 91, 92 connected to the two extremes and with optical input power of −10 dBm. The noise figure is around 5 dB.

The Applicant has observed that optical circulators 91 and 92 permit radiation to enter and exit in only one direction for each of optical amplifiers 93, 94 and precisely only the radiation propagating from transmission station 1A to receiving station 2B for amplifier 93 and only the radiation propagating from transmission station 1B to receiving station 2A for amplifier 94.

Optical circulators 91 and 92 therefore act as unidirectional components placed at the input and output of the two stages of optical amplifiers 93 and 94 and reduce the noise, particularly that due to counterpropagating spontaneous emission, Rayleigh and Brillouin scattering and their respective reflections along the communication line.

In addition to permitting the bidirectional amplification of the signals, the bidirectional amplifier described attenuates the propagating amplified spontaneous emission (ASE) along with the signals. In amplifiers 93 and 94, the ASE components coming from inputs 641 and 643 and those generated in active fibers 63 and 653 are removed by the respective comb filters and do not propagate to active fibers 66 and 656.

The Applicant has determined that bidirectional amplifier 9 functions stably without oscillations and with negligible interferometric noise. This is thought to derive from the fact that the arrangement of the signal wavelengths, along with the spectral characteristics of the comb filters, prevents the creation of possible feedback rings, including amplifiers 93 and 94, which might be formed in the presence of back-reflections along the optical fibers of line 8, e.g. by connectors of optical circulators 91 and 92 with said optical fiber of line 8.

An optical amplifier according to the present invention is well-suited for use not only along communication lines configured to have low reflections (e.g. employing low-reflection optical connectors and welds) but also along optical communication lines already installed and in the presence of components with non-negligible residual reflectivity, particularly if they are used along fiber-optic transmission lines in which the amplifier is connected to the line fibers by means of optical connectors, which may be of the type that transmit most-of the power of the signals transiting through them, and thus ensure the optical continuity of said signals, but which under some conditions reflect back a small portion of them (e.g. in case of an imperfect clamping caused by incorrect positioning of the two fiber ends inside them).

Nonetheless, to obtain a high signalinoise ratio in the transmission along the telecommunication system, such as to permit transmission at velocities greater than or equal to 2.5 Gb/s, the optical connections linking an optical amplifier 9 and optical communication line 8 have preferably a reflectivity of less than −31 dB, more preferably less than −40 dB. Furthermore, to facilitate the operations of line installation and maintenance, these optical connections should be realized with optical connectors.

The Applicant has determined that an optical amplifier of the type described minimizes the gain tilt, a phenomenon caused by the characteristics of the doped fiber and, in particular, by the relative level of amplified spontaneous emission (ASE) and the signals along the communication line and in the amplifiers cascaded along it, which consists of a variation in gain with the wavelength and results in different gains for the various channels.

Exploiting the small residual attenuation of the selective reflection filters in the band transmitted (about 0.1 dB, for example, for passage in each direction through each Bragg grating selective reflection filter), it is possible to arrange said filters, in the selective reflection circuit that is part of the comb filter, in an order such that it compensates for the differences in gain.

In greater detail, the channels subject to less gain can be attenuated to a lesser degree by connecting the selective reflection filters related to those channels in proximity to the extremity of the selective reflection circuit that is connected to optical circulator 64 (the signals are reflected after passing through a limited number of selective reflection filters, thus with less attenuation), and the channels subject to greater gain can be attenuated to a greater degree by connecting the respective selective reflection filters in proximity to the opposite extremity of the selective reflection circuit.

Should it be necessary to compensate for the gain tilt to a greater extent than permitted by the selective attenuation provided by the filters, sections of optical fiber with calibrated attenuation may be connected between the selective reflection filters.

To compensate for a predetermined difference in gain, in output to an amplifier, between signals of different wavelengths, the difference in attenuation of the two signals in the comb filter must generally be greater, in absolute value, than said predetermined difference in output gain.

In the configuration described with reference to FIG. 6, the distances between the filters connected along the selective reflection circuit increase as the wavelength increases, so that the attenuation of each channel is attenuated by 0.2 dB more ( due to the double passage) than the adjacent channel at a lower wavelength.

In one example, the Applicant evaluated the functioning of a bidirectional multichannel telecommunication system like the one described, in a configuration including five sections of optical fiber 8, each with maximum total attenuation of 26 dB (including attenuation at the optical splices), connected by four bidirectional amplifiers 9, each of the type described.

The Applicant has determined that this communication system permits the simultaneous transmission of 16 channels in each direction of propagation at a bit rate of 2.5 Gb/s, with a minimum signal/noise ratio of 13 dB (measured on an 0.5 nm band).

In a second example, the Applicant evaluated the functioning of a bidirectional multichannel communication system like the one described but configured to operate with 8 wavelengths in each direction of propagation, with the wavelengths of the signals propagating in one direction staggered with respect to those of the signals propagating in the opposite direction. The configuration considered includes five section of fiber-optic line 8, each with a maximum total attenuation of 28 dB (including the attenuation of the optical junctions), connected by four bidirectional amplifiers 9, each of the type described.

The Applicant determined that said communication system permits the simultaneous transmission of 8 channels in each direction of propagation at a bit rate of 2.5 Gb/s, with a minimum signaunoise ratio of 13 dB (measured on a 0.5 nm band).

In another example, regarding a communication system similar to the one in the second example but where the total maximum attenuation of each fiber-optic line section is 23 dB (including the attenuation of the optical splices), and in which the four bidirectional amplifiers include chromatic dispersion compensation means of the type indicated earlier, the Applicant determined that it is possible to transmit 8 channels simultaneously in each direction of propagation at a bit rate of 10 Gb/s, with a minimum signal/noise ratio of 18 dB (measured on a 0.5 nm band).

It is known that an optical communication system may assume the structure of an optical network connecting a number of stations to each other. Optical network is generally intended here to mean a set of fiber-optic transmission lines and their respective stations of interconnection, also known as interchange nodes. In the interchange nodes the optical signals can be routed from one of the transmission lines linked to the node to one or more of the other transmission lines linked to the node. Nodes for adding and dropping optical signals to or from the network may be positioned either along the transmission lines or at the interchange nodes. Some of the transmission lines in this optical network, in particular, may have a ring structure.

A particular example of optical network with nodes for adding or dropping signals is that of a WDM communication system comprising a fiber-optic line extended between transmission and receiving stations and intermediate stations for adding/dropping signals placed along the line. The signals at various wavelengths emitted by a transmission station propagate along an optical fiber, possibly through amplifiers, e.g. of the active optical fiber type, up to an intermediate signal addition/dropping station, which may be configured in such a way that the radiation to some of the signal wavelengths is dropped from the communication line and routed to specific receivers (which, for example, convert the signals into electrical form), while at the same time radiation to one or more of the same wavelengths, generally modulated by transmission signals (e.g. in electrical form) present at the input of the intermediate station, is inserted into the communication line downstream from the dropping point. The optical radiation output from the intermediate station is transmitted along an additional section of optical fiber, and possibly through additional amplifiers and intermediate stations for adding/dropping optical signals, until it reaches a receiving station.

Each wavelength constitutes an independent communication channel. The optical telecommunication system may be configured in such a way that it transmits optical signals separately between pairs of stations included between the terminal stations and the stations placed along the line. It is also possible to transmit independent signals with the same wavelength along lines without common sections.

In this communication line it is possible to add or drop signals at various points (nodes) along the line at some of the communication wavelengths, so that they travel only a portion of the line extension.

Figure 7:
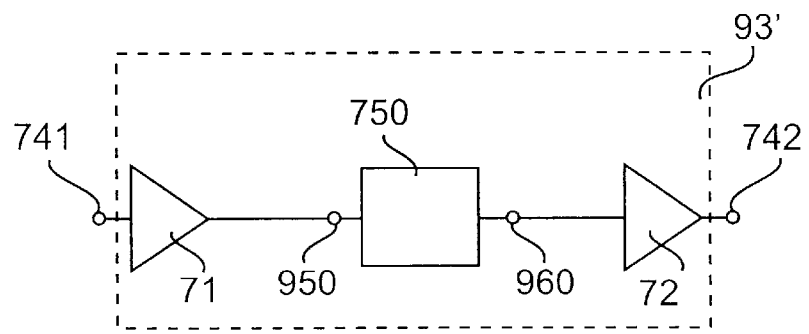
FIG. 7 is a diagram of an optical amplifier including a device for adding and dropping signals.

A scheme of a multichannel optical amplifier comprising a device of the first type for adding/dropping optical signals will now be described with reference to FIG. 7.

The figure represents an optical amplifier 93' suitable for use in a telecommunication system of the type described with reference to FIG. 1, in lieu of one or more optical amplifiers 93 of said system. In the example indicated in FIG. 7, amplifier 93' is suitable for amplifying optical signals propagating from transmission station 1A to receiving station 2B, at some of wavelengths $\lambda_1, \lambda_3, \ldots, \lambda_{31}$, unselected, to drop from the optical communication line signals at the remaining wavelengths $\lambda_1, \lambda_3, \ldots, \lambda_{31}$, selected, and to add to said line new signals at some or all of the selected wavelengths. The scheme in FIG. 7 may be modified, by known techniques, in such a way as to adapt it to the wavelengths to be amplified/dropped/added in each case of interest. It is possible, for example, to make an amplifier, not represented in the figure, to amplify optical signals propagating from transmission station 1B to receiving station 2A at some of wavelengths $\lambda_2, \lambda_4, \ldots, \lambda_{32}$, unselected, to drop from the optical communication line signals at the remaining wavelengths $\lambda_2, \lambda_4, \ldots, \lambda_{32}$, selected, and to add to said line new signals at some or all of the selected wavelengths.

Optical amplifier 93' includes one or more amplification stages between an input port 741 and an output port 742. The example indicates two amplification stages 71 and 72 that may, for example, be analogous to the amplification stages previous described with reference to amplifier 93 of FIG. 6.

A device 750 for adding/dropping optical signals and filtering is connected in an intermediate position between input port 741 and output port 742.

The position of said device 750 may be determined as previously indicated in relation to the amplifier of FIG. 6.

A device for adding and dropping signals to and from an optical fiber will now be described with reference to FIG. 8. Said device also performs a signal filtering action.

It comprises an input port 950 for optical signals at wavelengths $\lambda_1, \lambda_3, \ldots, \lambda_{31}$ connected to a first port of a first optical circulator 951. A second port of the optical circulator is connected to a selective reflection circuit 959, including optical filters 601, 605, ..., 629, cascade-coupled and with selective reflections to wavelengths $\lambda_1, \lambda_5, \ldots, \lambda_{29}$, respectively. The output of selective reflection circuit 959 is optically connected to a first input of a first wavelength selective switch 953. A first output of selective switch 953 is connected to a first port of a second optical circulator 961.

A second port of optical circulator 961 is connected to a selective reflection circuit 969, comprising optical filters 603, 607, ..., 631, cascaded and with selective reflection to wavelengths $\lambda_3, \lambda_7, \ldots, \lambda_{31}$. The output of selective reflection circuit 969 is optically coupled to a first input of a second wavelength selective switch 963. A first output of selective switch 963 is coupled to a third port of the first optical circulator 951.

The wavelengths of the series $\lambda_1, \lambda_5, \ldots, \lambda_{29}$ are staggered with respect to those of series $\lambda_3, \lambda_7, \ldots, \lambda_{31}$.

The separation between the wavelengths of adjacent channels between each of the two series is at least twice the minimum separation of adjacent channels between the signals at wavelengths $\lambda_1, \lambda_3, \ldots, \lambda_{29}, \lambda_{31}$ input to the device.

A third port of the second optical circulator 961 is connected to an output port 960.

Signals at one or more of wavelengths $\lambda_1, \lambda_3, \ldots, \lambda_{31}$, coming from outside, e.g. from transmitters 954, are multiplexed by means of a multiplexer 955 and routed to a second input of the first selective switch 953 through an optical amplifier 956.

The signals present at a second output of the first selective switch 953 are demultiplexed by means of a demultiplexer 957 and routed to an external user, consisting, for example of optical receivers 958 connected to the demultiplexer outputs.

Signals at one or more of wavelengths $\lambda_1, \ldots, \lambda_{29}$, coming from outside, e.g. from transmitters 964, are multiplexed by means of a multiplexer 965 and routed to a second input of the first selective switch 963, possibly through an optical amplifier 966.

The signals present at a second output of the first wavelength selective switch 963 are demultiplexed by means of a demultiplexer 967 and routed to an external user, consisting, for example, of optical receivers 968 connected to the demultiplexer outputs.

The device in FIG. 8 functions as follows.

The signals input to port 950 are transmitted through optical circulator 951 to selective reflection circuit 959. The signals at wavelengths $\lambda_1, \lambda_5, \ldots \lambda_{29}$ are reflected by filters 601, 605, ..., 629 to optical circulator 951, which transmits them to the first input of selective switch 963. The selective switch is suitable for transmitting signals at some of the wavelengths, selected by means of specific control signals, to the second output and for transmitting the signals at the remaining wavelengths to the first output. The signals reaching the second output are separated onto different optical paths, based on their respective wavelengths, by means of demultiplexer 967, and sent to respective receivers 968.

The signals at the selected wavelengths (included among wavelengths $\lambda_1, \lambda_5, \ldots, \lambda_{29}$) are thus separated from the remaining signals input at port 960 of the device. Signals at the same selected wavelengths, generated by transmitters 964, combined on to a single optical path by means of multiplexer 965 and amplified, if required, by optical amplifier 966, are sent by selective switch 963 from the second input port to the first output port of said switch. At the first output port of selective switch 963, therefore, the signals at the unselected wavelengths entering from the first input port of said selective switch are overlapped with signals at the selected wavelengths coming from transmitters 964.

Selective switch 963, as a whole, drops the incoming signals at the selected wavelengths and transmits in output the signals at the unselected wavelengths, to which the new signals at the selected wavelengths are added.

The signals at wavelengths $\lambda_1, \lambda_5, \ldots, \lambda_{29}$ output by selective switch 963 are then transmitted through selective reflection circuit 969 (said circuit 969, in fact, reflects none of wavelengths $\lambda_1, \lambda_5, \ldots, \lambda_{29}$) and, through optical circulator 961 are sent to output port 960.

The remaining signals input to port 950, with wavelengths $\lambda_3, \lambda_7, \ldots, \lambda_{31}$, follow partially different optical paths.

With greater detail, these signals reach selective reflection circuit 959, through optical circulator 951, and pass through it without being reflected, and thus reach the first input of selective switch 953. Said selective switch, similar to what was previous indicated for selective switch 963, drop to the second output the signals at some of wavelengths $\lambda_3, \lambda_7, \ldots, \lambda_{31}$ selected by means of control signals sent to said selective switch. The signals at the unselected wavelengths are routed to the first output of the selective switch, while signals at the selected wavelengths, present at the fist output of the selective switch, are overlapped at said first output with said signals at the unselected wavelengths.

The signals at wavelengths $\lambda_3, \lambda_7, \ldots, \lambda_{31}$ are subsequently transmitted through optical circulator 961 to selective reflection circuit 969. Filters 603, 607, ..., 631 in said circuit reflect the signal to optical circulator 961, which sent them to output 960. Thus at said output 960 signals at wavelengths $\lambda_3, \lambda_7, \ldots, \lambda_{31}$ are overlapped with signals at wavelengths $\lambda_1, \lambda_7, \ldots, \lambda_{29}$.

Radiation at wavelengths intermediate between those indicated, input from port 950, follows an optical path through optical circulator 951, selective reflection circuit 959, selective switch 953, optical circulator 961, selective reflection circuit 969, selective switch 963, optical circulator 951 and is them reflected back to port 950. This radiation at intermediate wavelengths is not transmitted, therefore, to output port 960, and the signals output by the device are filtered of any noise present at wavelengths intermediate between those of the signals.

The intermediate wavelength radiation reflected back to port 950 is attenuated, with respect to the input radiation at the same wavelengths, to an extent corresponding to the sum of the attenuation of the passed-through optical components. In the configuration described, for example, with the use of 8 cascaded selective reflection filters for each selective reflection circuit, the optical circulators and selective switches of the type described below, the maximum attenuation is around 9–10 dB.

Optical circulators 951, 961, selective reflection filters 601, ..., 631, transmitters 954, 964, multiplexers 955, 965, demultiplexers 957, 967 and receivers 958, 969 may be of the types described earlier.

Optical circulators 956, 966 are suitable for bringing the signals coming from transmitters 954 to a sufficient power level, with respect to that of the optical signals coming from input port 950, so that the relative power levels at output port 960 are equalized.

Wavelength selective switches 953, 963 are optical components suitable for transmitting optical signals between the two inputs and the two outputs based on the signal wavelengths and on appropriate control signals. By means of said control signals, input to each of these switches, it is possible to modify their transmission state, independently for each wavelength, in one of-the following two modes: bar mode, corresponding to the direct connection of said first input with said first output, and cross mode, corresponding to the connection of said first input with said second output and of said second input with said first output, respectively.

A selective switch is to advantage a 2×2 wavelength selective acousto-optical switch with polarization-independent response.

Integrated acoustooptical devices are known whose functioning is based on the interaction between light signals, propagating in waveguides made on a substrate of a birefringent photoelastic material, and acoustic waves propagating on the surface of the substrate, generated by means of appropriate transducers. The interaction between a polarized optical signal and an acoustic signal produces a conversion of signal polarization, i.e. rotation of the mutually orthogonal TE (transverse electrical) and TM (transverse magnetic) polarization components.

In said acoustooptical devices it is possible to tune the spectral response curve by controlling the frequency of the acoustic waves, making the devices suitable for use as switches in wavelength division multiplexed optical telecommunication networks. With these devices the signal selection can be modified without varying the component wiring. They also permit the simultaneous switching and selection of different signals or channels, if the acoustic wave propagating on the substrate surface is the superposition of different acoustic waves. In fact, the switches perform the combined switching of the signals at the wavelengths corresponding to the frequencies applied simultaneously to the electrodes of the electroacoustic transducers.

If a channel with a given wavelength is selected, input optical signals at that wavelength are routed to the corresponding cross state output (switch in the cross state). The unselected signals are routed from an input to the corresponding direct output (switch in the bar state).

Figure 9:
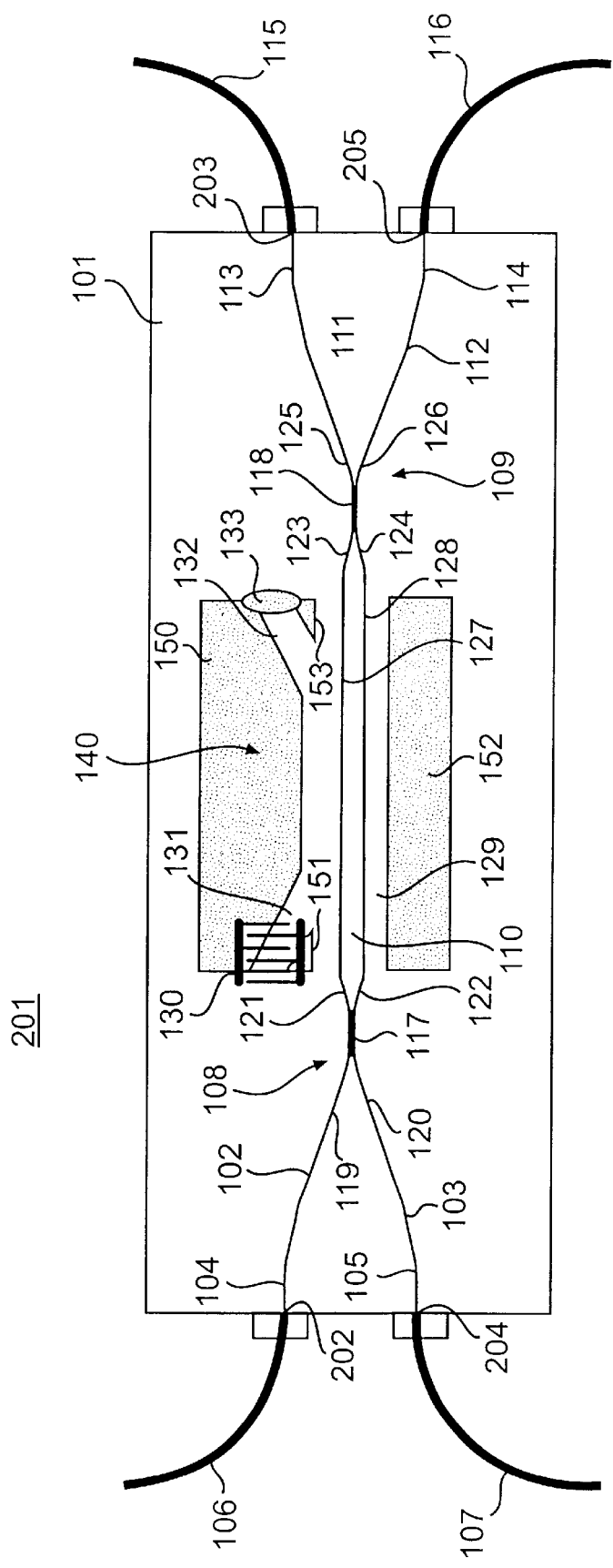
FIG. 9 is a diagram of a first type of acoustical-optical switch.

FIG. 9 shows one embodiment of an acoustooptical switch 201. The switch includes a substrate 101 of birefringent photoelastic material, consisting of lithium niobate ($LiNbO_3$).

Substrate 101 contains two branches of optical input waveguide 102 and 103, whose extremities 104 and 105 lodge the two input ports 202 and 204, to which respective connecting optical fibers 106 and 107 can be connected through known connection or "pigtailing" devices, schematically represented in the figure.

To allow connection to said optical fibers (with diameter of around 250 microns), ports 106 and 107 are preferably at least 125 pm apart.

Substrate 101 contains two polarization selective elements 108 and 109, a conversion stage 110 and two output optical waveguide branches 111 and 112, bearing at extremities 113, 114 the respective output ports 203, 205, through which respective output optical fibers 115, 116 are connected.

Polarization selective elements 108 and 109 consist preferably of polarization splitters, realized by means of evanescent-wave directional couplers that can separate into two output waveguides two respective polarizations fed to a common input and, respectively, combine in a common output waveguide two respective polarizations fed to two separate input waveguides. In particular, each of them comprises a central optical waveguide, 117 and 118 respectively, and pairs of input and output optical waveguides 119, 120, 121, 122 and 123, 124, 125, 126 respectively.

Conversion stage 110 comprises two parallel optical waveguide branches 127 and 128, connected to output waveguide pair 121 and 122 of polarization splitter 108 and to input waveguide pair 123 and 124 of polarization splitter 109.

It also comprises an acoustic waveguide 129, containing optical waveguide branches 127 and 128 and an electroacoustic transducer 130, formed of a pair of interdigital electrodes for generating an RF surface acoustic wave.

Conveniently, transducer 130 is placed in an acoustic waveguide 131 communicating with acoustic waveguide 129, so as to form an acoustic coupler. Acoustic absorber 133 is placed at the extremity of another acoustic waveguide 132, for receiving the acoustic signal from acoustic waveguide 129.

Acoustic waveguides 129, 131 and 132 are delimited by zones 150, 151, 152 and 153 in correspondence to which the substrate is doped so as to make the propagation velocity of the acoustic waves higher than in guides 129, 131 and 132, confining the acoustic signal in the guides.

The complex formed by electroacoustic transducer 130, acoustic waveguides 129, 131, 132 and the optical waveguides contained in acoustic guide 129 constitutes an acoustooptical converter 140, by which the acoustic signal interacts with the optical signals.

The switch of FIG. 9 functions in the following manner.

When no voltage is applied to electroacoustic transducer 130, the switch is in the off-state and in direct transmission condition (bar-state), in which there is direct correspondence between input ports 202 and 204 and output ports 203 and 205, respectively.

The light signals enter by ports 202 and 204 and enter polarization splitter 108, where the TE and TM polarization components are separated into waveguides 121 and 122, pass unaltered through branches 127 and 128 of conversion stage 110 and are then sent to polarization splitter 109, where the polarization components are recombined, sending the signals to waveguides 125 and 126, so that the signals entering by ports 202 and 204 exit unchanged from ports 203 and 205.

Applying an appropriate switching signal to the electrodes of transducer 130, the switch is placed in the on-state and passes into cross-transmission condition (cross-state) for the selected wavelengths, in which input ports 202 and 204 are in correspondence with crossed output ports 205 and 203, respectively.

To that end, transducer 130 generates an RF surface acoustic wave with acoustic driving frequencies $f_{ac}$ (about 174±10 MHz for devices operating around 1550 nm and 210±10 MHz for those operating around 1300 nm) corresponding to the optical resonance wavelengths at which the TE TM or TM TE polarization conversions take place for one or more predetermined signal wavelengths, for which switching is required.

The light signals enter polarization splitter 108, where polarization components TE and TM are separated and pass through branches 127 and 128 of conversion stage 110, where those of signals at the aforesaid predetermined wavelengths are transformed into their orthogonal components.

Polarization components TE and TM are then sent to polarization splitter 109 so that the selected polarization components coming from input port 202 exit from output port 205, along with the unselected components coming from port 204, and the selected polarization components coming from input port 204 exit from output port 203, along with the unselected components coming from port 202.

In this way the signals, which undergo a polarization conversion in conversion stage 110, are guided to the cross-state, producing the total switching function, while those that have not interacted with the acoustic wave pass unaltered.

Figure 10:
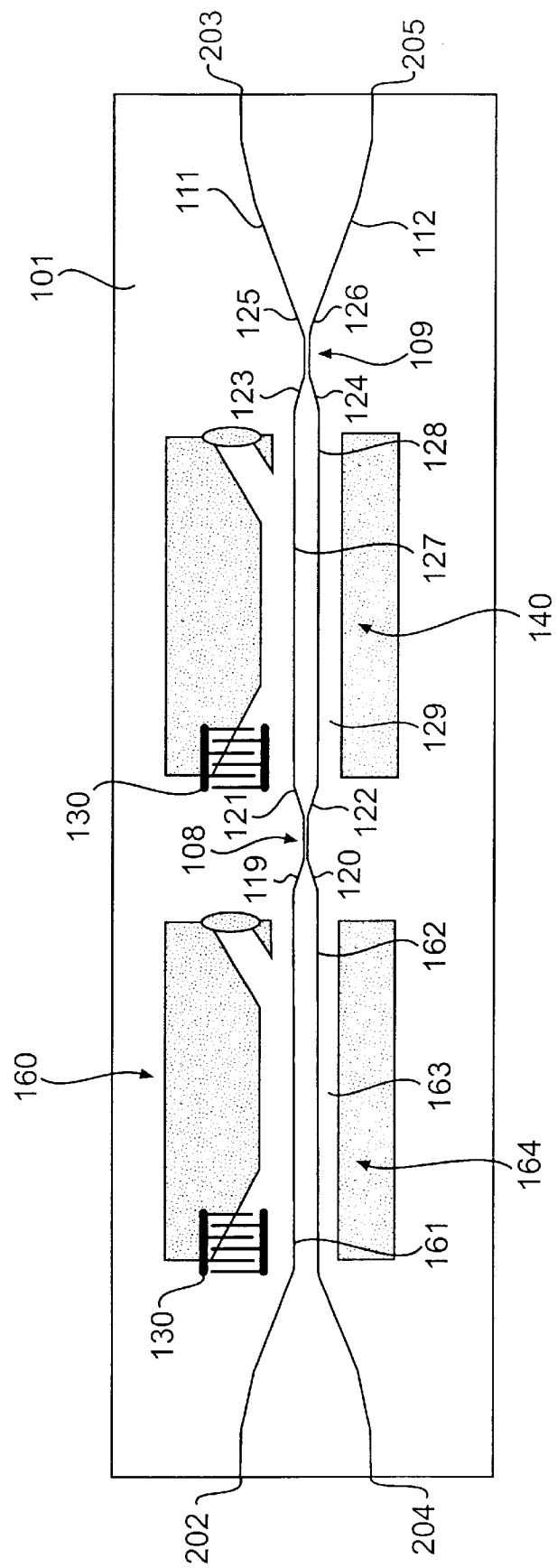
FIG. 10 is a diagram of a second type of acoustical-optical switch.

In a particular form of embodiment, illustrated in FIG. 10, substrate 101 also contains a compensator 160, comprising two parallel optical waveguide branches 161 and 162, connected at one extremity to input ports 202 and 204 and at the other extremity to branches 119 and 120 of polarization splitter 108.

The two optical waveguide branches 161 and 162 are contained within acoustic waveguide 129 of an acoustooptical converter 164, similar in structure to converter 140 described earlier, whose components are indicated with the same references.

In this embodiment, the input signals with the TE and TM polarization components travel through branches 161 and 162 of compensator 160 and, when converter 164 is switched on, are transformed into their orthogonal components, remaining combined.

Subsequently the signals enter a converter 140 contained on the same substrate and similar to that of the device in FIG. 9. In it the TE and TM polarization components are converted back into their original polarization state.

In that embodiment, the frequency shifts generated in the two TE and TM components of the signal as a result of acoustooptical interaction in the conversion stage should be compensated by the opposite shifts that take place in the compensation stage.

In an acoustooptical switch of the type indicated, made by the Applicant, the bandwidth for an attenuation of 20 dB, in correspondence to the cross-state, is around 2 nm.

The maximum attenuation of said switch is around 5 dB, including the attenuation of the respective optical connections.

Figure 8:
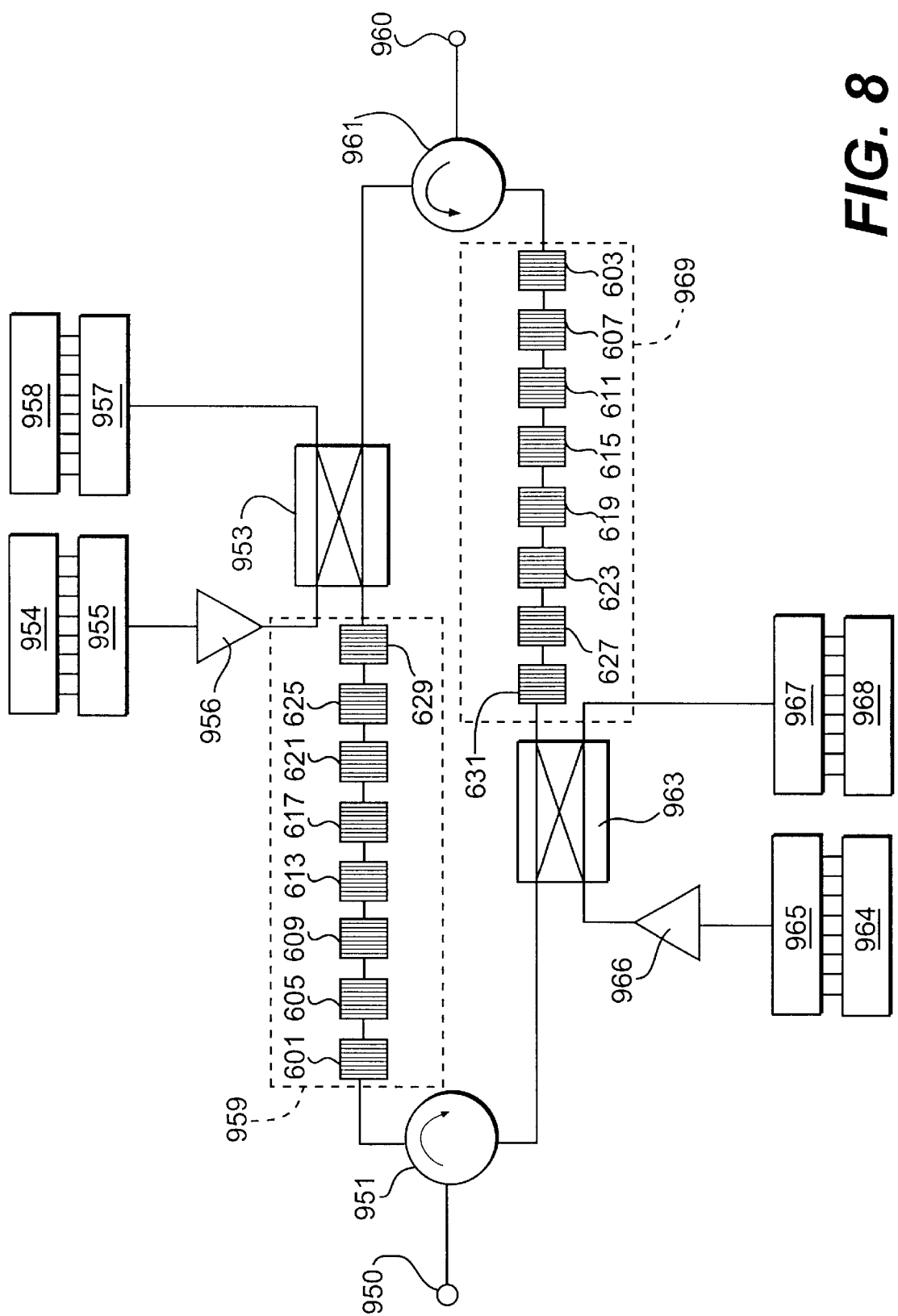
FIG. 8 is a diagram of a device for adding/dropping signals.

Said acoustooptical switch can therefore be employed in the device in FIG. 8 if the separation between adjacent channels at wavelengths $\lambda_3$, $\lambda_7$, ..., $\lambda_{31}$ and between adjacent channels at wavelengths $\lambda_1$, $\lambda_5$, ..., $\lambda_{29}$ is greater than or equal to 2 nm.

On the whole, acoustooptical switches of the type indicated may be employed in the device of FIG. 8, if the separation between adjacent channels, at all the wavelengths $\lambda_1$, $\lambda_3$, ..., $\lambda_{31}$ of the signal entering the device, is greater than or equal to 1 nm.

If the device of FIG. 8, having selective switches of the type described, is employed in an optical telecommunication system, the selective switches may be controlled by the supervision system of the communication system. In this way it is possible to rapidly reconfigure the wavelengths and number of channels to be dropped or added at the various nodes of the system, to satisfy changing requirements of traffic or breakdowns.

As a alternative, it is possible to employ, in lieu of the selective switch 953, 956, devices of another type that permit the adding and dropping of signals at some selected wavelengths to and from an optical line. These devices may also be of the passive type. In this case, the selection of wavelengths relative to the signals dropped and/or added to and from the line if made by selecting passive components with the desired spectral characteristics. A configuration of this type, al though a change in channel selection requires the replacement of optical components, offers the advantage of lower cost.

The Applicant observes that in the described device of FIG. 8 it is possible to use wavelength selective switches 953, 963 with a relative low wavelength resolution. In fact, it is sufficient for the selective switches to be suitable for separating signals differing in wavelength by double the minimum wavelength distance between signals input to the device.

What is claimed is:

1. Device for adding and dropping optical signals to and from an optical transmission path (8), comprising:
    an input (950) for a plurality of optical signals with distinct wavelengths;
    spectral selection means (951, 959) for sending at least a first of said signals to a first optical path and sending at least a second of said signals to a second optical path;
    a wavelength selective switching means (953; 963) along said first optical path, for adding and dropping at least an optical signal to and from said first optical path;
    means (961, 969) for combining optical signals form said first and said second path to an output (960),
    characterized in that said spectral selection means comprises:
        means (959) for dividing said plurality of optical signals in a first and a second series of optical signals, mutually staggered in wavelength, and
        means (951, 959) for sending said first series of optical signals to said first optical path and said second series of optical signals to said second optical path.

2. Device for adding and dropping optical signals as recited in claim 1, characterized by the fact that said spectral selection means comprises an optical circulator (951) and a selective reflection circuit (959).

3. Device for adding and dropping optical signals as recited in claim 2, characterized by the fact that said selective reflection circuit (959) comprises at least a Bragg grating filter (601, 605, . . . 629).

4. Device for adding and dropping optical signals as recited in claim 1, characterized by the fact that the wavelengths of said first and said second series of optical signals are separated by a value lower than the spectral resolution of said wavelength selective switching means (953; 963).

5. Multichannel optical telecommunication system for transmitting optical signals comprising:
    a fiber-optic line (8);
    means (1A, 901 . . . 931, 3A, 5A, 7A) for inputting to said line optical signals with distinct wavelengths separated by an amount greater than or equal to a minimum predetermined value;
    an adding/dropping unit (750) comprising
        spectral selection means (951, 959) for sending a first series of said optical signals from said fiber-optic line to a first optical path and sending a second series of said optical signals from said fiber-optic line to a second optical path and
        means (961, 969) for combining optical signals form said first and said second path to said optical fiber line (8),
        characterized in that said adding/dropping unit further comprises an acousto-optical wavelength selective switch (953; 963) associated with said first optical path and having a spectral resolution greater than or equal to double said minimum predetermined value, and in that said spectral selection means is such that the signals of said first series sent to said first optical path have a wavelength spacing greater than or equal to said spectral resolution of said acousto-optical wavelength selective switch (953; 963).

6. Method for adding and dropping optical signals to and from an optical transmission path (8) comprising the steps of:
    receiving from said optical transmission path a plurality of optical signals with distinct wavelengths;
    sending (951, 959) at least a first of said signals to a first optical path and at least a second of said signals to a second optical path;
    adding and dropping (953; 963) at least an optical signal to and from said first optical path;
    combining (961, 969) optical signals form said first and said second path to said optical transmission path,
    characterized in that said sending step comprises:
        dividing (959) said plurality of optical signals in a first and a second series of optical signals, mutually staggered in wavelength and
        sending (951, 959) said first series of optical signals to said first optical path and said second series of optical signals to said second optical path.

7. Device for dropping optical signals from an optical transmission path (8), comprising:
    an input (950) for a plurality of optical signals with distinct wavelengths;
    spectral selection means (951, 959) for sending at least a first of said signals to a first optical path and sending at least a second of said signals to a second optical path;
    a wavelength selective switching means (953; 963) along said first optical path, for dropping at least an optical signal from said first optical path;
    means (961, 969) for combining optical signals form said first and said second path to an output (960),
    characterized in that said spectral selection means comprises:
        means (959) for dividing said plurality of optical signals in a first and a second series of optical signals, mutually staggered in wavelength, and
        means (951, 959) for sending said first series of optical signals to said first optical path and said second series of optical signals to said second optical path.

8. Device for adding optical signals to an optical transmission path (8), comprising:
    an input (950) for a plurality of optical signals with distinct wavelengths;
    spectral selection means (951, 959) for sending at least a first of said signals to a first optical path and sending at least a second of said signals to a second optical path;
    a wavelength selective switching means (953; 963) along said first optical path, for adding at least an optical signal to said first optical path;
    means (961, 969) for combining optical signals form said first and said second path to an output (960),
    characterized in that said spectral selection means comprises:
        means (959) for dividing said plurality of optical signals in a first and a second series of optical signals, mutually staggered in wavelength, and
        means (951, 959) for sending said first series of optical signals to said first optical path and said second series of optical signals to said second optical path.

* * * * *